(12) United States Patent
Lougheed (10) Patent No.: US 7,966,765 B2
(45) Date of Patent: *Jun. 28, 2011

(54) BLENDED MULCH PRODUCT AND METHOD OF MAKING SAME

(75) Inventor: Doris Ericka Lougheed, Richmond (CA)

(73) Assignee: Terra-Mulch Products, LLC, Buffalo Grove, IL (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/343,567

(22) Filed: Dec. 24, 2008

(65) Prior Publication Data

US 2009/0120148 A1    May 14, 2009

Related U.S. Application Data

(62) Division of application No. 11/352,384, filed on Feb. 10, 2006, now Pat. No. 7,484,330.

(30) Foreign Application Priority Data

Feb. 9, 2006    (CA) ..................................... 2535801

(51) Int. Cl.
  *A01G 7/00*    (2006.01)
(52) U.S. Cl. ............................................................. 47/9
(58) Field of Classification Search ...................... 47/9
  See application file for complete search history.

(56) References Cited

U.S. PATENT DOCUMENTS

| | | |
|---|---|---|
| 1,962,806 A | 6/1934 | Clapp |
| 2,092,183 A | 9/1937 | Rehfeld |
| 2,158,025 A | 5/1939 | Van Hulst et al. |
| 2,699,629 A | 1/1955 | Wandel |
| 2,789,399 A | 4/1957 | Finn |
| 2,818,682 A | 1/1958 | Finn |
| 2,825,983 A | 3/1958 | Finn |
| 2,842,897 A | 7/1958 | Finn |
| 2,844,914 A | 7/1958 | Finn |
| 2,878,617 A | 3/1959 | Finn |

(Continued)

FOREIGN PATENT DOCUMENTS

| | | |
|---|---|---|
| EP | 0161766 B1 | 10/1989 |
| EP | 0492016 B1 | 9/2002 |
| GB | 2245555 A | 1/1992 |
| GB | 2254769 A | 10/1992 |
| WO | 9107534 | 5/1991 |
| WO | 9108759 | 6/1991 |
| WO | 9207985 | 5/1992 |

OTHER PUBLICATIONS

V. Steven Green and D.E. Stott—"Polyacrylamide: A Review of the Use, Effectiveness, and Cost of a Soil Erosion Control Amendment," 10th Intl. Soil Conservation Org. Meet., May 24-29, 1999 Purdue.

(Continued)

*Primary Examiner* — Francis T Palo
(74) *Attorney, Agent, or Firm* — Brooks Kushman P.C.

(57) ABSTRACT

In one aspect there is provided a blended mulch product which can be mixed with water and spray-applied to a ground surface to form an erosion control medium, the blended mulch product comprising: about 75% to about 92% by weight ligno-cellulosic fibers; about 1% to about 10% by weight substantially straight synthetic fibers; and a tackifier; wherein the substantially straight synthetic fibers maintain their substantially straight form in the blended mulch product and the erosion control medium. Also provided are slurries in which the blended mulch product is mixed with water to produce the slurry, the slurry is spray-applied to a ground surface and the slurry dries on the ground surface to form an erosion control medium.

20 Claims, 4 Drawing Sheets

U.S. PATENT DOCUMENTS

| | | |
|---|---|---|
| 2,879,003 A | 3/1959 | Finn |
| 2,923,093 A | 2/1960 | Allen |
| 2,949,871 A | 8/1960 | Finn |
| 2,952,492 A | 9/1960 | Finn |
| 2,952,493 A | 9/1960 | Finn |
| 2,990,019 A | 6/1961 | Finn |
| 3,091,436 A | 5/1963 | Finn |
| 3,241,173 A | 3/1966 | Finn |
| 3,292,307 A | 12/1966 | Finn |
| 3,407,432 A | 10/1968 | Finn |
| 3,517,514 A | 6/1970 | Visser |
| 3,644,171 A | 2/1972 | Bevan et al. |
| 3,696,559 A | 10/1972 | Hatton |
| 3,712,866 A | 1/1973 | Falconer |
| 3,763,072 A | 10/1973 | Krieger |
| 3,772,893 A | 11/1973 | Eilers |
| 3,812,615 A | 5/1974 | Jamison |
| 3,818,998 A | 6/1974 | Hessert |
| 3,881,278 A | 5/1975 | Videen |
| 3,895,956 A | 7/1975 | Yoshida et al. |
| 3,899,984 A | 8/1975 | Keyes et al. |
| 3,942,457 A | 3/1976 | Keyes et al. |
| 3,950,179 A | 4/1976 | Schneider |
| 3,973,355 A | 8/1976 | McKenzie |
| 3,986,365 A | 10/1976 | Hughes |
| 4,002,034 A | 1/1977 | Muhring et al. |
| 4,022,633 A | 5/1977 | Schneider |
| 4,051,086 A | 9/1977 | Reid |
| 4,058,124 A | 11/1977 | Yen et al. |
| 4,067,140 A | 1/1978 | Thomas |
| 4,128,692 A | 12/1978 | Reid |
| 4,297,810 A | 11/1981 | Hansford |
| 4,333,461 A | 6/1982 | Muller |
| 4,337,117 A | 6/1982 | Bodendorf et al. |
| 4,364,197 A | 12/1982 | Baron |
| 4,369,597 A | 1/1983 | Leep et al. |
| 4,414,776 A | 11/1983 | Ball |
| 4,415,463 A | 11/1983 | Moiser et al. |
| 4,432,666 A | 2/1984 | Frey et al. |
| 4,458,042 A | 7/1984 | Espy |
| 4,476,185 A | 10/1984 | Spittle |
| 4,624,868 A | 11/1986 | Muller |
| 4,637,759 A | 1/1987 | Owa et al. |
| 4,693,763 A | 9/1987 | Ross et al. |
| 4,743,288 A | 5/1988 | Hirsbrunner |
| 4,787,928 A | 11/1988 | Balassa |
| 4,790,691 A | 12/1988 | Freed |
| 4,826,880 A | 5/1989 | Lesniak et al. |
| 4,919,681 A | 4/1990 | Tyler et al. |
| 4,921,803 A | 5/1990 | Nohr |
| 5,007,766 A | 4/1991 | Freed et al. |
| 5,012,974 A | 5/1991 | Johnson |
| 5,017,319 A | 5/1991 | Shen |
| 5,053,482 A | 10/1991 | Tietz |
| 5,082,500 A | 1/1992 | Machtman et al. |
| 5,096,748 A | 3/1992 | Balassa |
| 5,195,465 A | 3/1993 | Webb et al. |
| 5,207,826 A | 5/1993 | Westland et al. |
| 5,226,255 A | 7/1993 | Robertson |
| 5,272,000 A | 12/1993 | Chenoweth et al. |
| 5,300,192 A | 4/1994 | Hansen et al. |
| 5,301,460 A | 4/1994 | Corbitt |
| 5,326,192 A | 7/1994 | Freed |
| 5,382,610 A | 1/1995 | Harada et al. |
| 5,456,733 A | 10/1995 | Hamilton |
| 5,459,181 A | 10/1995 | West et al. |
| 5,476,711 A | 12/1995 | Hebbard et al. |
| 5,484,501 A | 1/1996 | Jacobsen |
| 5,507,845 A | 4/1996 | Molnar et al. |
| 5,516,830 A | 5/1996 | Nachtman et al. |
| 5,532,298 A | 7/1996 | Monroe et al. |
| 5,556,033 A | 9/1996 | Nachtman |
| 5,649,495 A | 7/1997 | Salestrom |
| 5,679,364 A | 10/1997 | Levy |
| 5,741,832 A | 4/1998 | Spittle |
| 5,779,782 A | 7/1998 | Spittle |
| 5,849,364 A | 12/1998 | Nachtman et al. |
| 5,849,645 A | 12/1998 | Lancaster |
| 5,909,718 A | 6/1999 | Sheehan |
| 5,916,027 A | 6/1999 | Spittle |
| 5,942,029 A | 8/1999 | Spittle |
| 6,076,299 A | 6/2000 | Spittle et al. |
| 6,096,126 A | 8/2000 | Tanner et al. |
| 6,135,672 A | 10/2000 | Davidson |
| 6,155,749 A | 12/2000 | Tanner et al. |
| 6,156,682 A | 12/2000 | Fletemier et al. |
| 6,158,167 A | 12/2000 | Spittle |
| 6,349,499 B1 | 2/2002 | Spittle |
| 6,351,911 B1 | 3/2002 | Behrens |
| 6,360,478 B1 | 3/2002 | Spittle |
| D456,224 S | 4/2002 | Lancaster |
| D456,674 S | 5/2002 | Lancaster |
| 6,523,299 B2 | 2/2003 | Morris |
| 6,635,329 B1 | 10/2003 | Arndt et al. |
| 6,729,068 B2 | 5/2004 | Dooley et al. |
| 6,729,807 B1 | 5/2004 | Spittle |
| 7,484,330 B2 * | 2/2009 | Lougheed .......................... 47/9 |
| 7,681,353 B2 * | 3/2010 | Lougheed .......................... 47/9 |
| 7,752,804 B2 * | 7/2010 | Spittle et al. ....................... 47/9 |
| 2003/0060113 A1 | 3/2003 | Christie et al. |
| 2004/0091326 A1 | 5/2004 | Spittle |
| 2006/0070294 A1 * | 4/2006 | Spittle ............................... 47/9 |
| 2007/0180763 A1 * | 8/2007 | Lougheed .......................... 47/9 |
| 2007/0184744 A1 * | 8/2007 | Lougheed ..................... 442/381 |
| 2007/0186463 A1 * | 8/2007 | Lougheed .......................... 47/9 |
| 2008/0202024 A1 * | 8/2008 | Spittle et al. ...................... 47/9 |
| 2009/0120148 A1 * | 5/2009 | Lougheed ........................ 71/23 |
| 2009/0265979 A1 * | 10/2009 | Spittle et al. ...................... 47/9 |

OTHER PUBLICATIONS

Donald H. Gray/Robbin B. Sotir—Biotechnical and Soil Bioengineering SLOPE STABILIZATION —A Practical Guide for Erosion Control, Oct. 1995, 8 pages.

Organic Chemical Process Industry—Emission Factors—Section 6.9 Synthetic Fibers, Organic Chem. Process Industry, %o(Reformatted 1/95), pp. 6.9-1 to 6.9-22.

Finn Corporation—Finn A500 Hydro-Stick (Articles "Instructions for Use" etc.), 1998, 7 pages.

Finn Corporation—Finn A700 Fiber-Plus "Get More out of Your Mulch," 6 pages.

Material Safety Data Sheet—Identity: Finn FiberPlus Oct. 3, 2003, 2 pages.

Mechanically bonded fiber mulch—draft Abstract, Comparison between Spittle patents '782 (EK) and '029 (ES).

Erik Skindrud, Regional Editor "Sowing the Seeds: You Can Add Hydroseeding to Your Contracting Business" (Article), 5 pages.

Canadian Forest Products, Inc. "Tests of Various Rates of EcoAegis and Soil Guard for Erosion Control and Plant Growth Enhancement Under Simulated Rain and Sunlight"—Original Report: Dec. 1995; Corrected and amended: Jun. 1998 (Gilberto E. Urroz, Utah Water Research Laboratory, College of Engineering, Utah State University, Logan, Utah), 15 pages.

Canadian Forest Products Ltd. "Tests of New Erosion Control Product Under Simulated Rain and Sunlight—Test I"—Jul. 1995 (Gilberto E. Urroz, Utah Water Research Laboratory, College of Engineering, Utah State University, Logan, Utah), 14 pages.

Finn Corporation "Creating the Ideal Growing Environment" (Advertisement), 6 pages.

Canfor "EcoAegis Bonded Fiber Matrix—Control Erosion Better . . . Faster . . . and Easier . . . with Less Risk," 4 pages.

Finn Corporation—Finn Additive System FiberPlus, 1 page.

ASTM International—Designation D638-03 Standard Test Method for Tensile Properties of Plastics, pp. 1-15.

ASTM International—Designation D790-03 Standard Test Methods for Flexural Properties of Unreinforced and Reinforced Plastics and Electrical Insulating Materials, pp. 1-11.

ASTM International—Designation D883-00 Standard Terminology Relating to Plastics, pp. 1-15.

The Commonwealth of Pennsylvania Department of Transportation—Roadside Vegetation Management Research Report—Eleventh Year Report The Pennsylvania State University Research Project #85-08; Report #PA 97-4620+85-08, Jun. 12, 1997, 56 pages.

Canfor Brochure—EcoBlend with Recycled Cellulose—Engineered for Excellence, 2 pages.

ABC Fibers—Technical Data Sheet, Physical Properties: ABC Monofilament Fibers, 2 pages.

ProPlus Hydro Mulching Solutions—FiberLock(TM) including Guide Specification for Profile Fiberlock(TM) (formerly labeled as Locking Fiber), 7 pages.

Material Safety Data Sheet—Product Identification and Use; Product Identifier: EcoFibre PLUS TAC, 3 pages.

Canfor Panel and Fibre Marketing Ltd.—EcoFlex Flexible Control Medium—Specifications, 2 pages.

Nissan Kizai Nice, Inc.—Fiber Length "A Factor in Holding Capacity of Woodfiber Mulch" Aug./Sep. 1989, 1 page.

Finn Corporation Spring 1995—FinnInfo—News and thoughts from the Finn Corporation, 4 pages.

Finn Corporation—Finn A700 Fiber-Plus "Get More out of Your Mulch" (1 page) (Duplicate BH).

Jim Lincoln—"Hydro-Mulching—an Overview," 1992, James Lincoln Corp., 8 pages.

ICEA Standard Mulch and Mulch Mediums—Mar. 1, 1995, Mulch Standards Comm., Atlanta, 3 pages.

Land and Water—The Magazine of Natural Resource Management and Restoration Sep./Oct. 1992 "Hydraulic Planting" Special Reprinted Edition, 3 pages.

Hugh West, Ph.D. Weyerhaeuser Company—Terrasol Environment Industries "The Function of Continuous Cover in Preventing Soil Erosion from Rainfall Impact and Sheet Flow: The Evolution of Bonded Fiber Matrices," pp. 1-7.

Material Safety Data Sheet—Soil Guard—Weyerhaeuser Company, 2 pages.

Weyerhaeuser Soil Guard Bonded Fiber Matrix—The One Stop Erosion Control System for Better Performance at a Lower Cost, 8 pages.

Weyerhaeuser—Public Advisory—Weyerhaeuser's Soil Guard Applied to Fire-Ravaged Southern California Coast, 3 pages.

* cited by examiner

FIG. 5

BLENDED MULCH PRODUCT AND METHOD OF MAKING SAME

CROSS-REFERENCE TO RELATED APPLICATIONS

This application is a division of U.S. application Ser. No. 11/352,384 filed Feb. 10, 2006, now U.S. Pat. No. 7,484,330 issued Feb. 3, 2009, which, in turn, claims the benefit of Canadian patent application Serial No. 2535801 filed Feb. 9, 2006.

BACKGROUND OF THE INVENTION

1. Field of the Invention

The present invention relates generally to mulches and erosion control, and more particularly to a blended mulch product for making an erosion control medium for reducing erosion of a ground surface and a methods of making same.

2. Background Art

For large-scale revegetation work such as occurs during highway construction, large residential or commercial building construction, mine or landfill reclamation, hydraulic application of mulch is an efficient aid to control soil erosion and aid in revegetation. In general, existing mulches are typically placed or left on or near a soil surface to protect it from erosion and to aid in the establishment of vegetation. Once applied to the soil surface, the mulch forms a mat product to aid in erosion control and the revegetation process.

In order to apply mulch to a soil surface, traditionally, thermomechanically-refined or mechanically-refined virgin or recycled wood is added to water to form a wet slurry. Typically, the slurry is formed within a large tank equipped with mechanical agitators or circulation pumps (e.g. in a hydroseeder tank). When made into a slurry the mixture is pumped through an outlet hose or cannon. Natural or synthetic tackifiers are optionally added by the operator to the tank to improve the viscosity of the slurried mixture, to reduce friction of solid materials in the pump, to prevent plugging of the pumps and to aid in adhering the mulch to the underlying surface. However the addition of the tackifiers too quickly to the slurry can create "fisheyes" within the tackifier, resulting in reduced effectiveness of tackifier adhesion, decreased viscosity and potential plugging of hose nozzles. In addition, incorrect quantities of mulch components will compromise the performance of the product especially when the mulch is applied on steep slopes. In order to provide an alternative approach, certain pre-blended mulch products have been introduced into the marketplace.

In U.S. Pat. No. 5,476,711 a fiber blending system is described including an apparatus and method of forming a mat of cellulosic fibers and synthetic fibers. According to U.S. Pat. No. 5,476,711, the method disclosed includes the steps of fiberizing cellulosic material into cellulosic fibers in a fiberizer, volumetrically metering a metered amount of synthetic fibers, and injecting the metered amount of synthetic fibers into the cellulosic fibers. The cellulosic fibers are blended with the metered amount of synthetic fibers in a blending chamber to form a fiber blend. The fiber blend is dispersed through a fiber disperser having apertures of a pre-selected size and shape to provide a dispersed fiber blend. A third type of fiber may also be mixed with the dispersed fiber blend. The dispersed fiber blend is collected as a mat on a fiber collector to provide a mat of blended cellulosic and synthetic fibers. The mat may be thermobonded by a thermobonder and sandwiched between a facing sheet and a backing sheet.

U.S. Pat. No. 5,942,029 describes a water absorbent fiber mulch made from natural and crimped, synthetic fibers that are intimately mixed together to form the fiber mulch. In U.S. Pat. No. 5,942,029 the fiber mulch is a mechanically bonded, open weave accomplished by entanglement of the crimped synthetic fibers with one another and with the natural fibers to hold the mulch together in a matrix which is sufficiently open to allow air to pass through, and seedlings to grow up through. A water absorbent polymer-based material is dispersed throughout the fiber mulch to increase its water absorption capacity. Similar mulch products are found in U.S. Pat. Nos. 5,779,782 and 5,741,832.

Notwithstanding the mulch products in the field, there remains a need in the art for a mulch product having desirable properties and a substantially homogenous composition.

SUMMARY OF THE INVENTION

The present invention provides an improved blended mulch product and method of making same.

In one aspect of the invention, there is provided a blended mulch product which can be mixed with water and spray-applied to a ground surface to form an erosion control medium. The blended mulch product comprises (a) about 75% to about 92% by weight ligno-cellulosic fibers, (b) about 1% to about 10% by weight substantially straight synthetic fibers, and (c) a tackifier. In this aspect, the substantially straight synthetic fibers maintain their substantially straight form in the blended mulch product. Preferably, the substantially straight synthetic fibers maintain their substantially straight form in the erosion control medium.

In another aspect, there is provided another blended mulch product which can be mixed with water and spray-applied to a ground surface to form an erosion control medium. The blended mulch product consists of: (a) about 80% to about 90% weight ligno-cellulosic fibers, (b) about 1% to about 10% by weight substantially straight synthetic fibers, and (c) a tackifier. In this aspect, at least about 80% weight of the substantially straight synthetic fibers maintain their substantially straight form in the blended mulch product. Preferably at least about 80% by weight of the substantially straight synthetic fibers maintain their substantially straight form in the erosion control medium.

In another aspect, there is provided the blended mulch products of the invention, prepared by a process comprising a) fluffing the ligno-cellulosic fibers thereby forming fluffed ligno-cellulosic fibers, b) mixing the substantially straight synthetic fiber's with the fluffed ligno-cellulosic fibers, thereby forming mixed fibers, and c) mixing the tackifier with the mixed fibers, thereby forming the blended mulch product.

BRIEF DESCRIPTION OF THE DRAWINGS

In the accompanying drawings which illustrate embodiments of the invention.

DETAILED DESCRIPTION OF THE INVENTION

Reference will now be made in detail to implementations and embodiments of the invention, examples of which are illustrated in the accompanying drawings.

Figure 1:
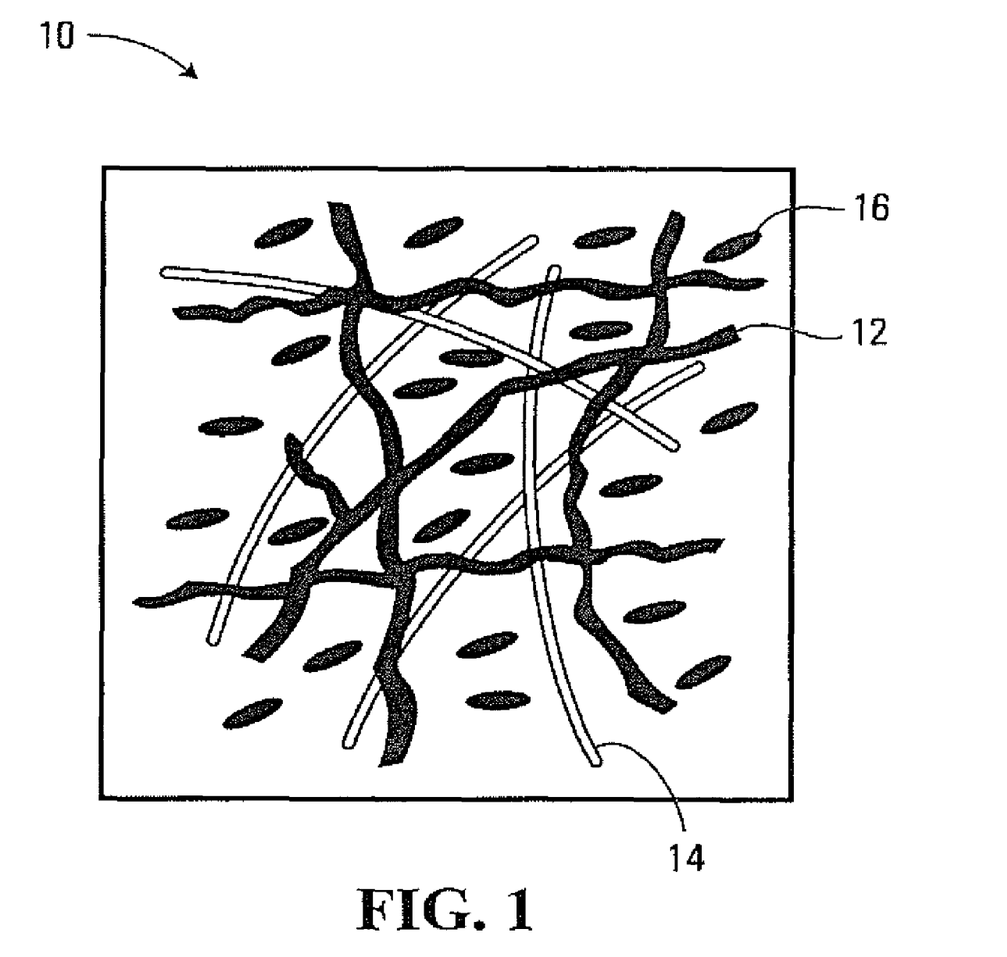
FIG. 1 illustrates a blended mulch product, according to a first embodiment of the invention.
Figure 5:
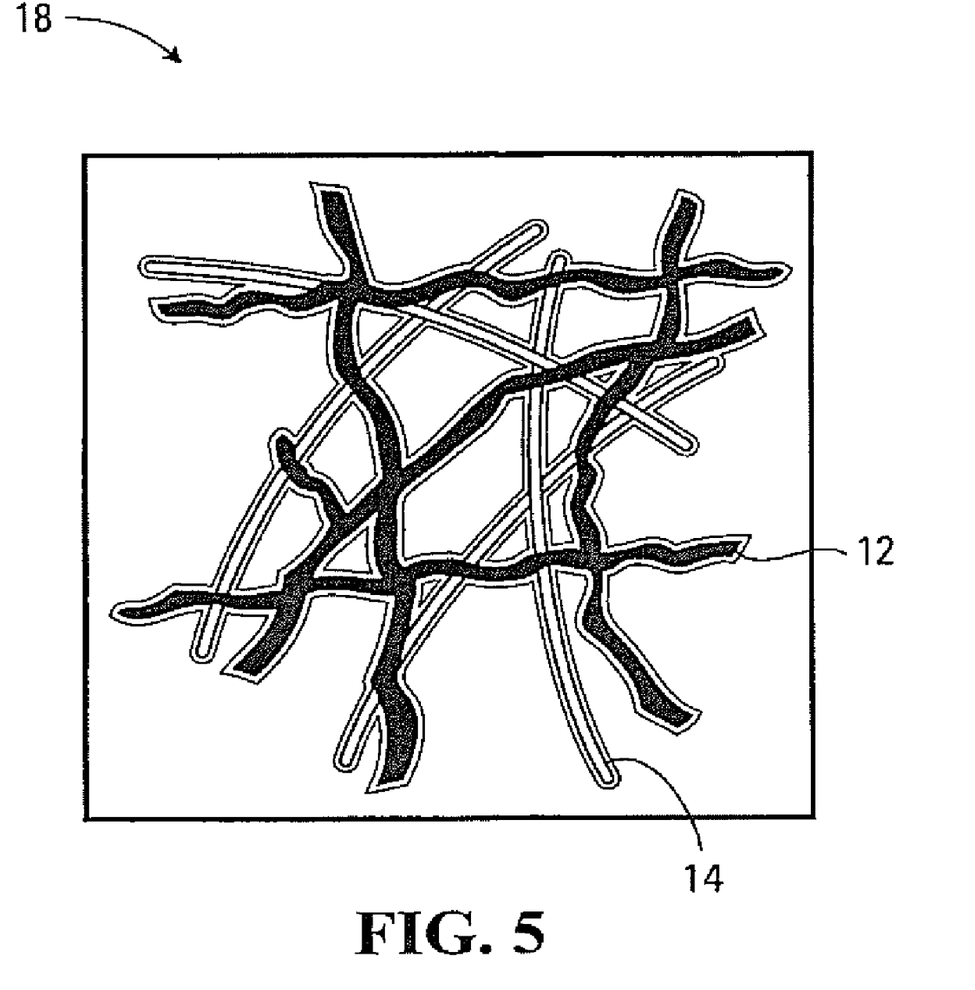
FIG. 5 illustrates the blended mulch product of FIG. 1 after being slurried and having dried.

Referring to FIG. 1, there is shown a first embodiment of a blended mulch product 10 according to one aspect of the present invention. The blended mulch product 10 comprises three components: ligno-cellulosic fibers 12, substantially straight synthetic fibers 14, and a tackifier 16. The blended mulch product 10 can be mixed with water and spray-applied to a ground surface to form an erosion control medium 18 (FIG. 5).

For the purposes of this specification, the term "substantially straight" means, when referring to a fiber, that the fiber may be straight or may be slightly bowed, slightly bent or contain some curvature. Substantially straight fibers do not have intentionally imparted sharp bends along the length of the fiber when manufactured. Bowing, bending or curving of the substantially straight synthetic fibers is not likely to be regular, unlike crimped synthetic fibers, which have intentionally imparted bends, that are typically sharp and regular in nature.

The ligno-cellulosic fibers 12 form a predominant component in the blended mulch product 10, comprising about 75% to about 92% by weight of the blended mulch product 10. The high concentration of ligno-cellulosic fibers 12 provides the erosion control medium 18 (e.g. a mulch matrix or mat product) with a large water holding capacity, to absorb water and discourage the saturation of the underlying soils. Preferably, the ligno-cellulosic fibers 12 comprise about 80% to about 90% by weight of the blended mulch product 10. More preferably, the ligno-cellulosic fibers 12 comprise about 85% to about 89% by weight of the blended mulch product 10. More preferably yet, the ligno-cellulosic fibers 12 comprise about 87% by weight of the blended mulch product 10.

The ligno-cellulosic fibers 12 are preferably thermomechanically refined wood fibers in the first embodiment, which have been dried to a moisture content of no more than about 9% to about 15%. Thermomechanical processes used to produce thermomechanically refined wood fibers are well-known in the art. In alternative variations, other ligno-cellulosic fibers 12 may be used, and preferably they also will be thermomechanically processed to destroy fungi, nematodes and other unwanted organisms. Sources for such fibers include sawmilling residues such as sawdust, planer shavings, post peeler shavings, pulp quality chips, pin chips and chip fines. Alternative sources for ligno-cellulosic fibers 12 include urban waste wood such as pallets or demolition wood. Preferably a softwood chip as produced from sawmilling is used, since the resultant fiber will be longer.

The thermomechanical process used to produce the refined wood fibers in the first embodiment separates wood chips into long strand fibers. This refining process separates individual wood fibers from each other. However lignin connecting individual fibers causes the appearance of some fiber bundles. The properties of the fiber bundles are developed by bending, crushing, pulling and pushing the fiber clumps caught between bar to bar surfaces of refiner plates used in the thermomechanical process. This is known as defiberization. The manipulation of the wood fibers in this way creates fragments branching or protruding from the main fiber stem that help in the entanglement of the erosion control medium 18 formed herein. A colored dye may be added to the refined wood fibers at this point of the manufacturing process. The colored dye may visually aid a person when applying a slurry to a surface. In particular, determining the application rate and the amount of surface already covered may be aided by addition of a dye to the wood fibers.

Whether or not a dye is added, the thermomechanical process may be continued by blowing the wood fibers through a flash dryer followed by cycloning to separate the air from the fibers. The cycloned fibers may then be placed onto a conveyor which feeds a baler. The dried wood fibers are typically compacted into 1500 pound bales or bags of smaller sizes between 40 to 60 pounds that may be subsequently transported.

In the first embodiment, the ligno-cellulosic fibers 12 are wood fibers comprising of northern softwood spruce-pine-fir (SPF) refined fibers. Such wood fiber can obtained from various sources. In the first embodiment, the northern softwood SPF refined fibers are EcoFibre™ product as supplied by Canadian Forest Products Ltd. These fibers are long and intertwine with one another, adding integrity to the erosion control medium 18 once formed on the ground surface.

In general, the ligno-cellulosic fibers 12 used in the blended mulch product 10 each individually may have a diameter from about 0.01 mm to about 0.22 mm and a length along an elongated portion from about 0.0625 inches to about 1.75 inches. The length of the ligno-cellulosic fibers 12 is determined by the process used to manufacture the ligno-cellulosic fibers 12. In a thermomechanical process, the refiner plate configuration, processing conditions and the species of wood chips fed to the refiner all contribute to the final length of the fibers produced. In the first embodiment, the ligno-cellulosic fibers 12 are manufactured to have a minimum of about 25% averaging 10 mm long and a minimum of about 50% of the fiber retained on a 24 mesh screen—as measured using the Ro-Tap fiber classification method (5 grams screened for 5 minutes). Preferably, about 65% to about 95% of the ligno-cellulosic fibers 12 in the blended mulch product 10 have a length in the 0.125 inch to 1 inch range. This latter range is preferred since ligno-cellulosic fibers 12 having a length in this range further promote the natural entanglement of the fibers in the erosion control medium 18 (once formed) while not impeding the proper mixing of the blended mulch product 10 with water in a hydroseeding tank to form a slurry, and while also allowing the slurry to flow uninhibited through a hydroseeding hose and nozzle so as to be spray-applied to a surface. Very fine fibers are not desired since they are associated with annoying levels of dust in the erosion control medium 18 and tend to float when added to water.

Preferably, the ligno-cellulosic fibers 12 used in the blended mulch product 10 have a high water absorbing capability. Typically such fibers can hold over twelve times their own weight in water. This property helps the erosion control medium 18 to absorb water from precipitation thereby minimizing the amount of rain penetrating to the underlying soils and this in turn helps prevent rilling of the soil. Furthermore, a high water absorbing capability increases the moisture holding ability of the erosion control medium 18, which in turn promotes seed germination and plant growth. Over a period of weeks, plant roots may penetrate the underlying soil and this will help to hold the soil surfaces together, thereby inhibiting soil erosion. The moist environment provided by the resulting erosion control medium 18 described herein together with an adequate supply of oxygen and warm temperatures often promotes eventual biodegradation of the mulch matrices themselves and the decay of the ligno-cellulosic fibers 12 which in turn provides a nutrient source for plants.

The tackifier 16 comprises between about 8% by weight to about 12% by weight of the blended mulch product 10 described herein. In the first embodiment, the tackifier 16 component is preferably a blended, cross-linked, hydrocolloid-based binder with mineral activators. A hydrocolloid is a substance that is capable of forming a gel with water. Macromolecules, such as carbohydrate polymers (e.g. polysaccharides such as cellulose and starch) or a protein, that are water soluble are general examples of hydrocolloids. Specific examples of hydrocolloids include: calcium carboxymethylcellulose, pectin, gelatin, high molecular weight carbowax, carboxypolymethylene, polyvinyl alcohol and guar gum. Natural tackifiers include bentonite clay-based tackifiers, polysaccharides and guar gum.

When the blended mulch product 10 is mixed with water in a hydroseeder tank, the tackifier 16 will dissolve in the slurry that forms. However, the tackifier 16 will not redissolve once the slurry comprising the blended mulch product 10 and water is spray applied to a ground surface and allowed to dry.

The function of the tackifier 16 is multifold. In the slurry, the tackifier 16 coats the fibers and adds viscosity to the slurry. The coated fibers have reduced friction, particularly when preparing the slurry from the blended mulch product 10, thereby reducing the stress applied to the mixing machinery and promoting a substantially homogenous slurry. Furthermore, when the slurry is pumped through a hose and nozzle, friction is reduced so that an even and consistent slurry may be applied to a ground surface to form an erosion control medium 18 on the surface having a substantially homogenous matrix. The reduced friction also extends pump life and lowers the requirement for pumping energy.

The tackifier 16 may provide adhesion of fibers to fibers, fibers to soil and soil to soil in the erosion control medium 18 formed on the ground surface. The fibers in the slurry, both the ligno-cellulosic fibers 12 and the synthetic fibers 14, lay on a soil surface while the liquid portion of the slurry penetrates to the underlying soil contributing to the binding of fibers to soil particles, soil particles to soil particles as well as fibers to fibers. Once dried, the fibers within the erosion control medium 18 are adhered together, forming a water absorbent cover that is porous and breathable and secures soil and seed that may be added in order to enhance the establishment of vegetation. The tackifier 16 also preferably provides wet strength to the erosion control medium 18. In addition, the erosion control medium 18 can be rewetted over periods of months and still retain its form. Rewetting occurs when the erosion control medium 18, after it has dried, is subjected to more water. Typically rewetting occurs via precipitous and/or wet weather.

A suitable tackifier 16 may be obtained from Apex Resources (Louisville, Ky. 40222) under the product name of "Formula D". Formula D contains guar, a natural polysaccharide gum, which is a very water absorbent material that hydrates in the presence of water over a period of time from upon addition to water to about 120 minutes. Formula D, and preferably any other tackifier 16 used, does not contain any synthetic polymers such as polyacrylamides. Formula D, and preferably any other tackifier 16 used, is not toxic to plant or aquatic life.

Referring to FIG. 1, the substantially straight synthetic fibers 14 comprise about 1% by weight to about 10% by weight of the blended mulch product 10. Larger concentrations of the substantially straight synthetic fibers 14 are less desirable since the substantially straight synthetic fibers 14 do not have a high water holding capacity. Preferably, the substantially straight synthetic fibers 14 comprise about 1% to about 7% by weight of the blended mulch product 10. More preferably, the substantially straight synthetic fibers 14 comprise about 2% to about 4% by weight of the blended mulch product 10. More preferably, the substantially straight synthetic fibers 14 comprise about 3% by weight of the blended mulch product 10.

The substantially straight synthetic fibers 14 are preferably stiffer than the ligno-cellulosic fibers 12 and are not as water absorbent as the ligno-cellulosic fibers 12. More preferably, the substantially straight synthetic fibers 14 are hydrophobic. The stiffness and non-absorbency characteristics preferably add additional wet strength to the erosion control medium 18 once formed on the ground surface. These characteristics are discussed further below.

The substantially straight synthetic fibers 14 are preferably resistant to crimping and maintain their substantially straight form in the blended mulch product 10. The substantially straight synthetic fibers 14 also preferably maintain their substantially straight form in the erosion control medium 18 that is formed once the blended mulch product 10 is mixed with water and spray-applied on the ground surface. In this specification, reference to a fiber being resistant to crimping means that it is resistant to having sharp, regular bends imparted on the fiber once the fiber forms part of the blended mulch product. Regular bends are bends that occur repeatedly on the same, individual fiber and in a consistent pattern on most or substantially all of the fibers in a sample of fibers, such as the regular bends appearing on crimped synthetic fibers. Crimped synthetic fibers have sharp, regular bends that repeat in a recurring manner on a fiber. Typically, these sharp, regular bends are intentionally imparted onto the fiber during the fiber manufacturing process, resulting in many or substantially all individual crimped synthetic fibers having remarkably similar, sharp, regular bending patterns with respect to each other.

Bends may be measured in degrees wherein a first portion on a fiber and a second portion on the same fiber have a common point and the angle measured is the angle between the first portion immediately on one side of the common point and the second portion immediately on the opposite side of the common point. Sharp bends include angles that are from about 1 degree to about 90 degrees. Preferably, the substantially straight synthetic fibers 14 are resistant to forming bends having angles of from about 1 degree to about 95 degrees. More preferably, the substantially straight synthetic fibers 14 are resistant to forming bends having angles of from about 1 degree to about 100 degrees. More preferably still, the substantially straight synthetic fibers 14 are resistant to forming bends having angles of from about 1 degree to about 105 degrees. More preferably still, the substantially straight synthetic fibers 14 are resistant to forming bends having angles of from about 1 degree to about 110 degrees. More preferably still, the substantially straight synthetic fibers 14 are resistant to forming bends having angles of from about 1 degree to about 115 degrees. More preferably still, the substantially straight synthetic fibers 14 are resistant to forming bends having angles of from about 1 degree to about 120 degrees. More preferably still, the substantially straight synthetic fibers 14 are resistant to forming bends having angles of from about 1 degree to about 125 degrees. More preferably still, the substantially straight synthetic fibers 14 are resistant to forming bends having angles of from about 1 degree to about 130 degrees. More preferably still, the substantially straight synthetic fibers 14 are resistant to forming bends having angles of from about 1 degree to about 135 degrees. More preferably still, the substantially straight synthetic fibers 14 are resistant to forming bends having angles of from about 1 degree to about 140 degrees. More preferably still, the substantially straight synthetic fibers 14 are resistant to forming bends having angles of from about 1 degree to about 145 degrees.

More preferably still, the substantially straight synthetic fibers 14 are resistant to forming bends having angles of from about 1 degree to about 150 degrees. More preferably still, the substantially straight synthetic fibers 14 are resistant to forming bends having angles of from about 1 degree to about 155 degrees. More preferably still, the substantially straight synthetic fibers 14 are resistant to forming bends having angles of from about 1 degree to about 160 degrees. More preferably still, the substantially straight synthetic fibers 14 are resistant to forming bends having angles of from about 1 degree to about 165 degrees. More preferably still, the substantially straight synthetic fibers 14 are resistant to forming bends having angles of from about 1 degree to about 170 degrees. More preferably still, the substantially straight synthetic fibers 14 are resistant to forming bends having angles of from about 1 degree to about 175 degrees.

The substantially straight synthetic fibers 14 may be selected to be resistant to forming angles of a particular severity by selecting substantially straight synthetic fibers 14, at least in part, by providing substantially straight synthetic fibers 14 having a suitable tensile modulus, flexural modulus, as well as other properties described herein.

Preferably, the substantially straight synthetic fibers 14 are each monofilament fibers that are sufficiently resistant to crimping so as not to promote fiber entanglement in the blended mulch product 10. Monofilament fibers are fibers consisting of only a single strand and not a twisted or braided plurality of strands. Fiber entanglement is not promoted when a fiber is able to mix and move within the blended mulch product without generally interlocking with other fibers. That is when a substantially straight synthetic fiber 14 interacts with another fiber, interlocking typically does not occur and the substantially straight synthetic fiber 14 is capable of movement within the mulch product independent of the other fibers. In one aspect, two substantially straight synthetic fibers 14 are not capable of interlocking with one another, since there are no sharp bends or branches with which to interlock. The branched and bent nature of the ligno-cellulosic fibers 12 may interlock other fibers, including substantially straight synthetic fibers 14. However, since the substantially straight synthetic fibers 14 are resistant to sharp, regular bends, they allow the ligno-cellulosic fibers 12 to move along or proximate to the length of the elongated portion of a substantially straight synthetic fiber 14 unimpeded by sharp bends, thereby avoiding further fiber entanglement that would otherwise arise if one were to use crimped synthetic fibers instead of the substantially straight synthetic fibers 14. In this way, the substantially straight synthetic fibers 14 enable one to avoid clumping of fibers when the substantially straight synthetic fibers 14 are mixed with ligno-cellulosic fibers 12 and tackifier 16 to form a preferably homogenous blend.

Crimped synthetic fibers pose a problem if one wishes to have a mulch product that is substantially homogenous in its composition, as crimped synthetic fibers increase the amount of entanglement within the mulch product, thereby making the mixing and preparation of the blended mulch product and the slurry, once added to water, more difficult. Use of the substantially straight synthetic fibers 14 helps avoid this problem and promotes a desirable blended mulch product 10 that is substantially homogenous. Furthermore, crimped synthetic fiber has the potential to entangle with other crimped synthetic fibers, promoting the bailing of the synthetic fibers, which is not desirable.

For the purposes of this specification, "substantially homogeneous" means that substantially the same ratio of components may be found throughout an applicable blended mulch product, slurry or erosion control medium 18 (as the case may be). The ratio of components should be generally consistent regardless of the cross-section, volume or amount of blended mulch product 10, slurry or erosion control medium 16 examined. Small deviations, up to about 25%, in the ratio are also considered to be substantially homogenous. Preferably, blended mulch products 10, slurries and erosion control mediums 18 only have deviations up to about 20%. More preferably, blended mulch products 10, slurries and erosion control mediums 18 only have deviations up to about 15%. More preferably still, blended mulch products 10, slurries and erosion control mediums 18 only have deviations up to about 10%. Large clumps are a common source of non-homogenous portions of blended mulch products, slurries and erosion control mediums.

Figure 2:
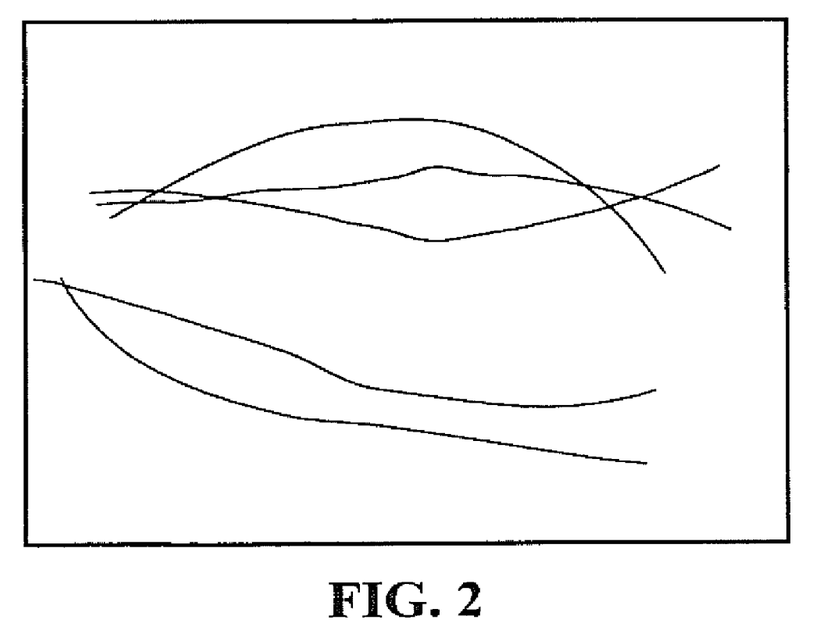
FIG. 2 illustrates monofilament synthetic fibers as used in the first embodiment of the invention.
Figure 3:
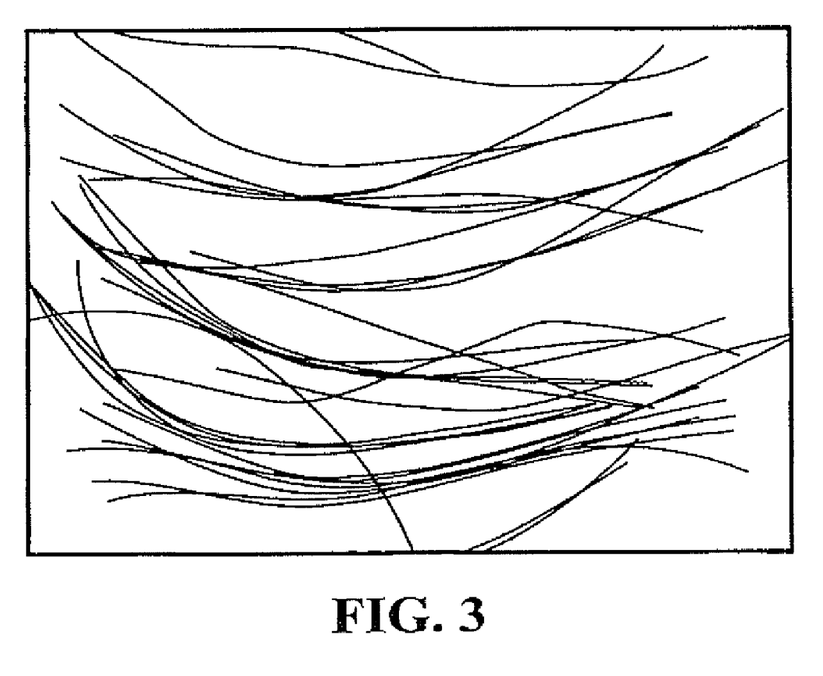
FIG. 3 illustrates monofilament synthetic fibers as used in another embodiment of the invention.

The substantially straight synthetic fibers 14 are preferably monofilament fibers as illustrated in FIGS. 2 and 3. More preferably, the substantially straight synthetic fibers 14 are manufactured to be sufficiently short in length so as to reduce or minimize additional entanglement of fibers in the blended mulch product 10. Each fiber has an elongated portion, which is the portion of the fiber that has the largest or longest distance measurement. The substantially straight synthetic fibers 14 preferably each have a length along their elongated portion in the range of about 0.25 inches to about 3 inches. More preferably yet, the substantially straight synthetic fibers 14 have a length in the range of about 0.3125 inches to about 1 inch, and even more preferably yet in the range of about 0.375 inches to about 0.625 inches. The substantially straight synthetic fibers 14 typically have a denier measurement in the range of about 4 denier to about 8 denier, preferably in the range of about 4.5 denier to about 7.5 denier and more preferably about 6 denier.

The substantially straight synthetic fibers 14 each have a maximum potential length that can be measured by measuring the distance ($D_{max}$) between two end points located at opposing ends of the elongated portion of the substantially straight synthetic fiber 14 when the fiber is completely straight. $D_{max}$ is also referred to herein as the maximum potential distance. In this way, with any particular synthetic fiber, having a first end point and a second end point, with the first end point and the second end point located at opposing ends of the elongated portion of the particular synthetic fiber, the maximum potential distance ($D_{max}$) can be measured along the elongated portion of the particular synthetic fiber when the particular synthetic fiber is completely straight.

The substantially straight synthetic fibers will typically have some bowing, bending or curvature along their length when used in the blended mulch product and the erosion control medium contemplated herein. However, preferably when used in the blended mulch product and the erosion control medium, the shortest notional straight-line distance between the aforementioned first and second end points, located at opposing ends of the elongated portion of the applicable synthetic fiber, will be at least about 60% of the distance between the first and second end points when the synthetic fiber is completely straight. The shortest notional straight-line distance is the distance between the first and second end points of the applicable synthetic fiber as measured along a notional straight line between the first and second end points, when the applicable synthetic fiber is at least substantially straight, but not necessarily completely straight. The shortest notional straight-line distance is also referred to herein as the notional shortest distance ($D_{not}$).

The ratio between the notional shortest distance and the maximum potential distance can be used as a measure of the degree of straightness of the fiber. This ratio is termed the straight ratio of the fiber ($D_{not}$:$D_{max}$), also referred to as a "straight fiber ratio". When the straight ratio is 1:1 the applicable synthetic fiber is completely straight and therefore has equal $D_{not}$ and $D_{max}$ values.

Preferably, the straight ratio of substantially straight synthetic fibers 14 is between about 3:5 to about 1:1. More preferably, the straight ratio of substantially straight synthetic fibers 14 is between about 13:20 to about 1:1. More preferably still, the straight ratio of substantially straight synthetic fibers 14 is between about 7:10 to about 1:1. More preferably still, the straight ratio of substantially straight synthetic fibers 14 is between about 3:4 to about 1:1. More preferably still, the straight ratio of substantially straight synthetic fibers 14 is between about 4:5 to about 1:1. More preferably still, the straight ratio of substantially straight synthetic fibers 14 is between about 17:20 to about 1:1. More preferably still, the straight ratio of substantially straight synthetic fibers 14 is between about 9:10 to about 1:1. More preferably still, the straight ratio of substantially straight synthetic fibers 14 is between about 19:20 to about 1:1.

The amount of substantially straight synthetic fibers 14 that are used to make a blended much product 10 or are in a blended mulch product 10 or are in an erosion control medium 18 that have a preferred straight ratio may also vary. In one aspect, preferably at least 60% of the substantially straight synthetic fibers 14 have a straight ratio of between about 3:5 and about 1:1. More preferably, at least 65% of the substantially straight synthetic fibers 14 have a straight ratio of between about 3:5 and about 1:1. More preferably, at least 70% of the substantially straight synthetic fibers 14 have a straight ratio of between about 3:5 and about 1:1. More preferably, at least 75% of the substantially straight synthetic fibers 14 have a straight ratio of between about 3:5 and about 1:1. More preferably, at least 80% of the substantially straight synthetic fibers 14 have a straight ratio of between about 3:5 and about 1:1. More preferably, at least 85% of the substantially straight synthetic fibers 14 have a straight ratio of between about 3:5 and about 1:1. More preferably, at least 90% of the substantially straight synthetic fibers 14 have a straight ratio of between about 3:5 and about 1:1. More preferably, at least 95% of the substantially straight synthetic fibers 14 have a straight ratio of between about 3:5 and about 1:1. More preferably, substantially all of the substantially straight synthetic fibers 14 have a straight ratio of between about 3:5 and about 1:1.

In another aspect, preferably at least 60% of the substantially straight synthetic fibers 14 may have a straight ratio of between about 13:20 and about 1:1. More preferably, at least 65% of the substantially straight synthetic fibers 14 have a straight ratio of between about 13:20 and about 1:1. More preferably, at least 70% of the substantially straight synthetic fibers 14 have a straight ratio of between about 13:20 and about 1:1. More preferably, at least 75% of the substantially straight synthetic fibers 14 have a straight ratio of between about 13:20 and about 1:1. More preferably, at least 80% of the substantially straight synthetic fibers 14 have a straight ratio of between about 13:20 and about 1:1. More preferably, at least 85% of the substantially straight synthetic fibers 14 have a straight ratio of between about 13:20 and about 1:1. More preferably, at least 90% of the substantially straight synthetic fibers 14 have a straight ratio of between about 13:20 and about 1:1. More preferably, at least 95% of the substantially straight synthetic fibers 14 have a straight ratio of between about 13:20 and about 1:1. More preferably, substantially all of the substantially straight synthetic fibers 14 have a straight ratio of between about 13:20 and about 1:1.

In another aspect, preferably at least 60% of the substantially straight synthetic fibers 14 may have a straight ratio of between about 7:10 and about 1:1. More preferably, at least 65% of the substantially straight synthetic fibers 14 have a straight ratio of between about 7:10 and about 1:1. More preferably, at least 70% of the substantially straight synthetic fibers 14 have a straight ratio of between about 7:10 and about 1:1. More preferably, at least 75% of the substantially straight synthetic fibers 14 have a straight ratio of between about 7:10 and about 1:1. More preferably, at least 80% of the substantially straight synthetic fibers 14 have a straight ratio of between about 7:10 and about 1:1. More preferably, at least 85% of the substantially straight synthetic fibers 14 have a straight ratio of between about 7:10 and about 1:1. More preferably, at least 90% of the substantially straight synthetic fibers 14 have a straight ratio of between about 7:10 and about 1:1. More preferably, at least 95% of the substantially straight synthetic fibers 14 have a straight ratio of between about 7:10 and about 1:1. More preferably, substantially all of the substantially straight synthetic fibers 14 have a straight ratio of between about 7:10 and about 1:1.

In another aspect, at least 60% of the substantially straight synthetic fibers 14 may have a straight ratio of between about 3:4 and about 1:1. More preferably, at least 65% of the substantially straight synthetic fibers 14 have a straight ratio of between about 3:4 and about 1:1. More preferably, at least 70% of the substantially straight synthetic fibers 14 have a straight ratio of between about 3:4 and about 1:1. More preferably, at least 75% of the substantially straight synthetic fibers 14 have a straight ratio of between about 3:4 and about 1:1. More preferably, at least 80% of the substantially straight synthetic fibers 14 have a straight ratio of between about 3:4 and about 1:1. More preferably, at least 85% of the substantially straight synthetic fibers 14 have a straight ratio of between about 3:4 and about 1:1. More preferably, at least 90% of the substantially straight synthetic fibers 14 have a straight ratio of between about 3:4 and about 1:1. More preferably, at least 95% of the substantially straight synthetic fibers 14 have a straight ratio of between about 3:4 and about 1:1. More preferably, substantially all of the substantially straight synthetic fibers 14 have a straight ratio of between about 3:4 and about 1:1.

In another variation, preferably, at least 60% of the substantially straight synthetic fibers 14 have a straight ratio of between about 4:5 and about 1:1. More preferably, at least 65% of the substantially straight synthetic fibers 14 have a straight ratio of between about 4:5 and about 1:1. More preferably, at least 70% of the substantially straight synthetic fibers 14 have a straight ratio of between about 4:5 and about 1:1. More preferably, at least 75% of the substantially straight synthetic fibers 14 have a straight ratio of between about 4:5 and about 1:1. More preferably, at least 80% of the substantially straight synthetic fibers 14 have a straight ratio of between about 4:5 and about 1:1. More preferably, at least 85% of the substantially straight synthetic fibers 14 have a straight ratio of between about 4:5 and about 1:1. More preferably, at least 90% of the substantially straight synthetic fibers 14 have a straight ratio of between about 4:5 and about 1:1. More preferably, at least 95% of the substantially straight synthetic fibers 14 have a straight ratio of between about 4:5 and about 1:1. More preferably, substantially all of the substantially straight synthetic fibers 14 have a straight ratio of between about 4:5 and about 1:1.

In another aspect, preferably at least 60% of the substantially straight synthetic fibers 14 may have a straight ratio of between about 17:20 and about 1:1. More preferably, at least 65% of the substantially straight synthetic fibers 14 have a straight ratio of between about 17:20 and about 1:1. More preferably, at least 70% of the substantially straight synthetic fibers 14 have a straight ratio of between about 17:20 and about 1:1. More preferably, at least 75% of the substantially straight synthetic fibers 14 have a straight ratio of between about 17:20 and about 1:1. More preferably, at least 80% of the substantially straight synthetic fibers 14 have a straight ratio of between about 17:20 and about 1:1. More preferably, at least 85% of the substantially straight synthetic fibers 14 have a straight ratio of between about 17:20 and about 1:1. More preferably, at least 90% of the substantially straight synthetic fibers 14 have a straight ratio of between about 17:20 and about 1:1. More preferably, at least 95% of the substantially straight synthetic fibers 14 have a straight ratio of between about 17:20 and about 1:1. More preferably, substantially all of the substantially straight synthetic fibers 14 have a straight ratio of between about 17:20 and about 1:1.

In another aspect, preferably at least 60% of the substantially straight synthetic fibers 14 may have a straight ratio of between about 9:10 and about 1:1. More preferably, at least 65% of the substantially straight synthetic fibers 14 have a straight ratio of between about 9:10 and about 1:1. More preferably, at least 70% of the substantially straight synthetic fibers 14 have a straight ratio of between about 9:10 and about 1:1. More preferably, at least 75% of the substantially straight synthetic fibers 14 have a straight ratio of between about 9:10 and about 1:1. More preferably, at least 80% of the substantially straight synthetic fibers 14 have a straight ratio of between about 9:10 and about 1:1. More preferably, at least 85% of the substantially straight synthetic fibers 14 have a straight ratio of between about 9:10 and about 1:1. More preferably, at least 90% of the substantially straight synthetic fibers 14 have a straight ratio of between about 9:10 and about 1:1. More preferably, at least 95% of the substantially straight synthetic fibers 14 have a straight ratio of between about 9:10 and about 1:1. More preferably, substantially all of the substantially straight synthetic fibers 14 have a straight ratio of between about 9:10 and about 1:1.

In another aspect, preferably at least 60% of the substantially straight synthetic fibers 14 may have a straight ratio of about 1:1. More preferably, at least 65% of the substantially straight synthetic fibers 14 have a straight ratio of about 1:1. More preferably, at least 70% of the substantially straight synthetic fibers 14 have a straight ratio of about 1:1. More preferably, at least 75% of the substantially straight synthetic fibers 14 have a straight ratio of about 1:1. More preferably, at least 80% of the substantially straight synthetic fibers 14 have a straight ratio of about 1:1. More preferably, at least 85% of the substantially straight synthetic fibers 14 have a straight ratio of about 1:1. More preferably, at least 90% of the substantially straight synthetic fibers 14 have a straight ratio of about 1:1. More preferably, at least 95% of the substantially straight synthetic fibers 14 have a straight ratio of about 1:1. More preferably, substantially all of the substantially straight synthetic fibers 14 have a straight ratio of about 1:1.

Once the blended mulch product 10 is mixed with water, the short length of the substantially straight synthetic fibers 14 allows the substantially straight synthetic fibers 14 to be carried within the resulting slurry without impeding the mixing or the pumping performance of the slurry. In addition, the slender nature of the substantially straight synthetic fiber 14 means that it is slender enough to offer stiffness to the erosion control medium 18, while not enabling bridging within the hydroseeder spray nozzle, thus not plugging the hydroseeder hose. An excessive length of this stiffer, substantially straight synthetic fiber can possibly entwine around the agitators in a hydroseeder mixing tank or entwine synthetic-to-synthetic, forming clumps, which produces mulch products, slurries and erosion control mediums 18 that are not substantially homogenous, which is undesirable.

The ratio of substantially straight synthetic fiber 14 to ligno-cellulosic fiber 12 within the blended mulch product 10 is preferably in the range of about 1:100 to about 1:10. More preferably in the range of about 1:50 to about 1:20.

The substantially straight synthetic fibers 14 preferably have a greater stiffness and resistance to crimping than the ligno-cellulosic fibers 12 that also form part of the blended mulch product 10. Stiffness and resistance to crimping is promoted through the use of substantially straight synthetic fibers 14 manufactured to have certain characteristics with respect to one or more properties, in particular with respect to one or more of the following: flexural modulus (psi), and tensile modulus (psi). Preferably, at least two of these properties have minimum characteristics to promote stiffness and resistance to crimping.

Tensile modulus, and flexural modulus are properties well known to one skilled in the art. In the first embodiment, tensile modulus is measured in accordance with ASTM Standard D638 titled "Standard Test Method for Tensile Properties of Plastics", published by ASTM International (www.astm.com). As well, in the first embodiment, the flexural modulus is a flexural property measured in accordance with ASTM Standard D790 titled "Standard Test Methods for Flexural Properties of Unreinforced and Reinforced Plastics and Electrical Insulating Materials", published by ASTM International.

In one variation, preferably the substantially straight synthetic fibers 14 used for the blended mulch product 10 have one or more of the following properties, and more preferably all of the following properties, falling in the corresponding range set out in Table 1 below:

TABLE 1

| Property | Range |
| --- | --- |
| Tensile Modulus (psi) | at least about 60,000 |
| Flexural Modulus (psi) | at least about 80,000 |

The tensile modulus of a substantially straight synthetic fiber 14 suitable for use in blended mulch products 10 and erosion control mediums 18 described herein may range from about 60,000 psi or higher. Preferably substantially straight synthetic fibers 14 have a tensile modulus of at least about 60,000 psi and more preferably between about 85,000 psi to about 350,000 psi. In another aspect, substantially straight synthetic fibers 14 have a tensile modulus of between about 90,000 psi to about 200,000 psi. In another aspect, substantially straight synthetic fibers 14 have a tensile modulus of between about 100,000 psi to about 210,000 psi. In another aspect, substantially straight synthetic fibers 14 have a tensile modulus of between about 110,000 psi to about 220,000 psi. In another aspect, substantially straight synthetic fibers 14 have a tensile modulus of between about 120,000 psi to about 230,000 psi. In another aspect, substantially straight synthetic fibers 14 have a tensile modulus of between about 130,000 psi to about 240,000 psi. In another aspect, substantially straight synthetic fibers 14 have a tensile modulus of between about 140,000 psi to about 250,000 psi. In another aspect, substantially straight synthetic fibers 14 have a tensile modulus of between about 150,000 psi to about 260,000 psi. In another aspect, substantially straight synthetic fibers 14 have a tensile modulus of between about 160,000 psi to about 270,000 psi. In another aspect, substantially straight synthetic fibers 14 have a tensile modulus of between about 170,000 psi to about 280,000 psi. In another aspect, substantially straight synthetic fibers 14 have a tensile modulus of between about 180,000 psi to about 290,000 psi. In another aspect, substantially straight synthetic fibers 14 have a tensile modulus of between about 190,000 psi to about 300,000 psi. In another aspect, substantially straight synthetic fibers 14 have a tensile modulus of between about 200,000 psi to about 310,000 psi. In another aspect, substantially straight synthetic fibers 14 have a tensile modulus of between about 210,000 psi to about 320,000 psi. In another aspect, substantially straight synthetic fibers 14 have a tensile modulus of between about 220,000 psi to about 330,000 psi. In another aspect, substantially straight synthetic fibers 14 have a tensile modulus of between about 220,000 psi to about 340,000 psi. In another aspect, substantially straight synthetic fibers 14 have a tensile modulus of between about 230,000 psi to about 350,000 psi. In another aspect, substantially straight synthetic fibers 14 have a tensile modulus of between about 240,000 psi to about 360,000 psi. In another aspect, substantially straight synthetic fibers 14 have a tensile modulus of between about 250,000 psi to about 370,000 psi. In another aspect, substantially straight synthetic fibers 14 have a tensile modulus of between about 260,000 psi to about 380,000 psi. In another aspect, substantially straight synthetic fibers 14 have a tensile modulus of between about 270,000 psi to about 390,000 psi. In another aspect, substantially straight synthetic fibers 14 have a tensile modulus of between about 280,000 psi to about 400,000 psi. In another aspect, substantially straight synthetic fibers 14 have a tensile modulus of between about 290,000 psi to about 410,000 psi. In another aspect, substantially straight synthetic fibers 14 have a tensile modulus of between about 300,000 psi to about 420,000 psi. In another aspect, substantially straight synthetic fibers 14 have a tensile modulus of between about 310,000 psi to about 430,000 psi. In another aspect, substantially straight synthetic fibers 14 have a tensile modulus of between about 320,000 psi to about 440,000 psi. In another aspect, substantially straight synthetic fibers 14 have a tensile modulus of between about 330,000 psi to about 450,000 psi. In another aspect, substantially straight synthetic fibers 14 have a tensile modulus of between about 340,000 psi to about 460,000 psi. In another aspect, substantially straight synthetic fibers 14 have a tensile modulus of between about 350,000 psi to about 470,000 psi. In another aspect, substantially straight synthetic fibers 14 have a tensile modulus of between about 360,000 psi to about 480,000 psi.

The flexural modulus of a substantially straight synthetic fiber 14 suitable for use in blended mulch products 10 and erosion control mediums 18 described herein may range from about 80,000 psi or higher. Preferably substantially straight synthetic fibers 14 have a flexural modulus of at least about 80,000 psi and more preferably between about 130,000 psi to about 300,000 psi. In another aspect, substantially straight synthetic fibers 14 have a flexural modulus of between about 140,000 psi to about 310,000 psi. In another aspect, substantially straight synthetic fibers 14 have a flexural modulus of between about 150,000 psi to about 320,000 psi. In another aspect, substantially straight synthetic fibers 14 have a flexural modulus of between about 160,000 psi to about 330,000 psi. In another aspect, substantially straight synthetic fibers 14 have a flexural modulus of between about 170,000 psi to about 340,000 psi. In another aspect, substantially straight synthetic fibers 14 have a flexural modulus of between about 180,000 psi to about 350,000 psi. In another aspect, substantially straight synthetic fibers 14 have a flexural modulus of between about 190,000 psi to about 360,000 psi. In another aspect, substantially straight synthetic fibers 14 have a flexural modulus of between about 200,000 psi to about 370,000 psi. In another aspect, substantially straight synthetic fibers 14 have a flexural modulus of between about 210,000 psi to about 380,000 psi. In another aspect, substantially straight synthetic fibers 14 have a flexural modulus of between about 220,000 psi to about 390,000 psi. In another aspect, substantially straight synthetic fibers 14 have a flexural modulus of between about 230,000 psi to about 400,000 psi. In another aspect, substantially straight synthetic fibers 14 have a flexural modulus of between about 240,000 psi to about 410,000 psi. In another aspect, substantially straight synthetic fibers 14 have a flexural modulus of between about 250,000 psi to about 420,000 psi. In another aspect, substantially straight synthetic fibers 14 have a flexural modulus of between about 260,000 psi to about 430,000 psi. In another aspect, substantially straight synthetic fibers 14 have a flexural modulus of between about 270,000 psi to about 440,000 psi. In another aspect, substantially straight synthetic fibers 14 have a flexural modulus of between about 280,000 psi to about 450,000. In another aspect, substantially straight synthetic fibers 14 have a flexural modulus of between about 290,000 psi to about 460,000 psi. In another aspect, substantially straight synthetic fibers 14 have a flexural modulus of between about 300,000 psi to about 470,000 psi.

In the first embodiment, the substantially straight synthetic fibers 14 used to form the blended mulch product 10 are polypropylene monofilament fibers. In another variation, other substantially straight synthetic fibers 14 that exhibit desirable properties as described herein may be used provided they are resistant to crimping and maintain their substantially straight form in the blended mulch product. Such substantially straight synthetic fibers 14 are often thermoplastics. A thermoplastic is a plastic which may be softened by heat and hardened by cooling in a reversible physical process. Other suitable substantially straight synthetic fibers 14 may include, by way of illustration, substantially straight polyolefins, polyesters and/or polyamide fibers (e.g. nylon).

The physical nature of the substantially straight synthetic fiber 14 (e.g. polypropylene) results in the substantially straight synthetic fiber 14 being hydrophobic. As a result, the substantially straight synthetic fiber 14 does not impart additional water holding capacity to the erosion control medium 18, rather the hydrophobicity of the substantially straight synthetic fiber 14 will keep the substantially straight synthetic fiber 14 stiff, not limp and will impart greater wet strength to the erosion control medium 18 when rewetted. Furthermore, the shorter substantially straight synthetic fibers 14, being resistant to bending, are resistant to compression and provide greater volume within the 3-dimensional erosion control medium 18 due to their substantially straight nature and the flexural and tensile properties described above.

In the first embodiment, the substantially straight synthetic fibers 14 used for the blended mulch product 10 are polypropylene monofilament fibers that have the properties set out in Table 2 below:

TABLE 2

| Property | Range |
| --- | --- |
| Tensile Modulus (psi) | about 220,000 |
| Flexural Modulus (psi) | about 200,000 |

Such polypropylene monofilament fibers are available from ABC Fibers, a division of Alabama Bag Co., LLC of 300 M.H. Williams Dr., Helena Industrial Park, Helena, Ala. 35080.

In another aspect of the present invention, the substantially straight synthetic fibers used to form blended mulch products 10 are a polyolefin. Suitable examples of polyolefins include polypropylenes and polyethylenes.

In another aspect of the present invention, the substantially straight polypropylene fibers used to form blended mulch products 10 are of a particular grade of polypropylene. Preferably, the polypropylene fibers are made from extrusion grade polypropylene.

In another aspect of the present invention, the substantially straight synthetic fibers 14 may be made from polyethylenes. A specific, non-limiting example of a suitable polyethylene is high density polyethylene. Polyethylenes and polypropylenes used to make substantially straight synthetic fibers 14 for use in blended mulch products may be made using any particular starting monomer/monomers, as is understood to one of skill in the art.

In another aspect of the present invention, the substantially straight synthetic fibers 14 may be made from a polyester. A specific example, for the purpose of non-limiting illustration, of a polyester that may be used to make substantially straight synthetic fibers 14 for use in blended mulch products 10 include unrefined polyethylene terephthalate.

In another aspect, the substantially straight synthetic fibers 14 may be made from nylon.

In another aspect, the substantially straight synthetic fibers 14 comprise a mixture of different polypropylenes, polyamides, polyesters, polyethylenes, and nylons, including and/or excluding any of these types of fibers from the mixture are provided.

Table 3 below illustrates some of the inherent mechanical properties measured using ASTM standards 638 and 790 of some non-limiting examples of synthetic polymers that are commercially available and that may be used to make substantially straight synthetic fibers 14 for use in blended mulch products 10.

TABLE 3

| Synthetic | Tensile Modulus (psi) | Flexural Modulus (psi) |
|---|---|---|
| Extrusion Grade Polypropylene | about 220,000 to about 250,000 | about 135,001 to about 300,000 |
| Nylon | about 50,800 to about 430,000 | about 63,800 to about 425,000 |
| High Density Polyethylene | about 116,000 to about 144,000 | about 72,500 to about 222,000 |
| Unrefined Polyethylene Terephthalate (Overview) | about 358,000 to about 435,000 | about 145,000 |

In one variation of the first embodiment, it is preferable that the substantially straight synthetic fibers 14 will photo-degrade.

The substantially straight synthetic fibers 14 add physical strength and stiffness to the erosion control medium 18 (e.g. mat product/mulch matrix), particularly when rewetted and improve the impact resistance of the erosion control medium 18 to the rain. The substantially straight synthetic fibers 14 also preferably increase the loft within the erosion control medium 18, providing improved shock absorbency and increased aeration within the erosion control medium 18.

The presence of the substantially straight synthetic fibers 14 preferably does not result in an increase in dry tensile strength of the erosion control medium 18 as compared to an erosion control medium without the substantially straight synthetic fibers 14. Measuring dry tensile strength is within the knowledge of a person of skill in the art. An example of how to measure the dry tensile strength of an erosion control medium is also described in Example 1.

More preferably, the presence of the substantially straight synthetic fibers 14 in the blended mulch product 10 increases the wet tensile strength of the erosion control medium 18 formed from the blended mulch product 10 as compared to an erosion control medium formed from blended mulch product without the substantially straight synthetic fibers 14. Measuring wet tensile strength is within the knowledge of a person of skill in the art. An example of how to measure the wet tensile strength of an erosion control medium is also described in Example 2.

Preferably, when the substantially straight synthetic fibers 14 are resistant to crimping, their inclusion in the blended mulch product 10 increases the modulus of elasticity of the erosion control medium 18 formed from the blended mulch product 10 as compared to an erosion control medium form from a blended mulch product without the substantially straight synthetic fibers 14. Measuring the modulus of elasticity is within the knowledge of a person of skill in the art. An example of how to measure the modulus of elasticity of an erosion control medium is described in Example 3.

Preferably, the average modulus of elasticity of samples of an erosion control medium 18 formed from the blended mulch product 10 of the first embodiment will be at least about 11,500 psi. More preferably, the average modulus of elasticity of samples of the erosion control medium 18 formed from the blended mulch product 10 will be at least about 13,000 psi. More preferably yet, the average modulus of elasticity of samples of the erosion control medium formed from the blended mulch product 10 will be at least about 14,000 psi.

In another variation, the substantially straight synthetic fibers 14 make up at least about 80% by weight of all synthetic fibers in the blended mulch product 10. More preferably, the substantially straight synthetic fibers 14 make up substantially all of the synthetic fibers in the blended mulch product 10.

In the first embodiment, the blended mulch product 10 described herein is typically prepared by mechanically blending the components together, although other methods of mixing known to one skilled in the art may be used. In the first embodiment, typically, three components, ligno-cellulosic fibers 12, tackifier 16 and the substantially straight synthetic fibers 14 are mechanically blended in specific ratios and placed in a 50 pound plastic bag. The plastic bag keeps the moisture content of the blended mulch product 10 at about 12%+/−3%. Other quantities of blended mulch product 10 and other forms of packaging can be used.

Figure 4:
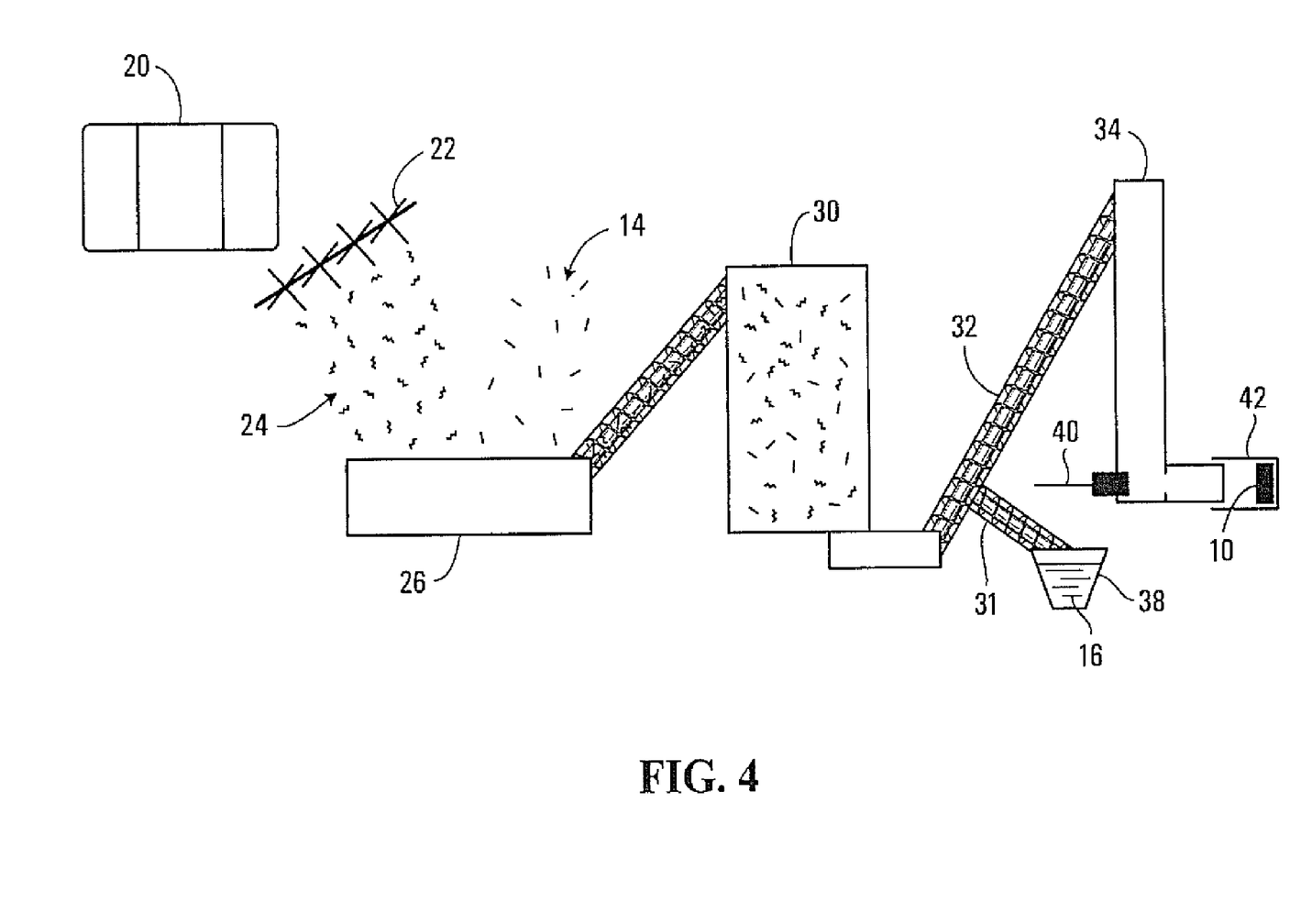
FIG. 4 illustrates a method of producing a blended mulch product, according to the first embodiment of the invention.

FIG. 4 illustrates a typical method for preparing and packaging of the blended mulch product 10 (in FIG. 1). Compacted baled, ligno-cellulosic fibers 20 are placed on a conveyor (not shown) and opened with a bale breaker 22. Fluffed ligno-cellulosic fibers 24 are augered into a fluffing bin 26 to continue to open the ligno-cellulosic fibers. Substantially straight synthetic fibers 14 are then added and augered together with the fluffed ligno-cellulosic fibers 24 into a fluffing bin 30. Augering helps to blend the different types of fibers together. The mixed fiber is then conveyed with a larger auger 32 to the top of a holding tower 34. Tackifier 16, held in a tackifier hopper 38, is metered into the large auger 32 via a small auger 31. Substantial mixing occurs in the large auger 32. The holding tower 34 holds the blended mulch product 10 and gravity feeds the blended mulch product 10 to a packaging ram 40. The packaging ram 40 plunges and compresses the blended mulch product 10 thereby packaging the blended mulch product 10 in a bag 42.

Such a packaging procedure with mechanical mixing of the components of the blended mulch product 10 helps to thoroughly mix the individual fibers and tackifier 16 so that the blended mulch product 10 is substantially homogeneous. The substantially straight synthetic fibers 14 are advantageous since they will slide and mix more effectively with the refined wood fibers, resulting in a more homogeneous blend.

The dry blending of the components (the ligno-cellulosic fibers 12, the substantially straight synthetic fibers 14 and the tackifier 16) can affect the performance characteristics of the slurry and erosion control medium 18 once the blended mulch product 10 is mixed with water and applied. Mechanical blending provides a suitable dispersion of the components within the blended mulch product 10, reducing or preventing clumping of fibers (e.g. due to entanglement) and reducing or preventing uneven dispersion of the tackifier 16. Clumping of fibers and/or uneven dispersion of the tackifier 16 in the slurry can cause machinery used, such as a hydroseeder, to apply the slurry to a surface to clog or breakdown. Clumping of fibers and/or uneven dispersion of the tackifier 16 can result in weak spots in the erosion control medium 18 formed using the blended mulch product 10. Use of the substantially straight synthetic fibers 14 in the blended mulch product 10 also helps minimize the risk of clumping of the substantially straight synthetic fibers 14 which can occur if one were to use crimped synthetic fibers.

Blended mulch products 10 described herein are formed into slurries by the addition of water. Optionally, other materials such as seeds, fertilizers, lime and other additives may also be added to blends or slurries, prior to the addition of water or after the addition of water, when preparing slurries. Typical ratios of water to blend (water:blend) that are used to prepare slurries described herein are shown, for illustration purposes only, in Table 4 below.

TABLE 4

| Tank Size (US gal.) | Blended Mulch (lb) | Water (US gal.) |
| --- | --- | --- |
| 900 | 300 | 820 |
| 1200 | 400 | 1090 |
| 1700 | 566 | 1550 |
| 2500 | 833 | 2270 |
| 3300 | 1100 | 3000 |

The mixing of the blended mulch product 10 with water to form a slurry is preferably achieved by starting with a tank having about 25% of the quantity of water to be used and proceeding to add the blended mulch product 10 and remaining water simultaneously, yet over a period of time to allow for thorough mixing. The period of time for the mixing of the blended mulch product 10 and the water is preferably not less than 5 minutes and not more than 120 minutes. For the duration of the addition of water and blended mulch product 10 to the tank, the tank should be agitated. Once all of the blended mulch product 10 and water is in the tank, agitation is preferably continued for a period of not less than about 5 minutes, and preferably not less than about 10 minutes, in order to achieve a higher quality slurry. Typical hydroseeding tanks known in the art are suitable for preparing slurries described herein.

If seed is to be added, it is preferably added when the tank is about half full, although the addition of seed may be done at anytime. Fertilizer is preferably added at the end, once all the other components of the slurry have been added, although fertilizer may also be added at anytime.

Preparing a blended mulch product 10, having the components described herein and that is substantially homogeneous, promotes the formation of a substantially homogeneous slurry when the blended mulch product 10 is mixed with water. A substantially homogeneous slurry is pumpable through lengths of hosing for application to the desired ground surface. Preferably, the components of the blended mulch product 10 act together, when mixed with water, to reduce the blockage of hosing and other spray apparatus and machinery, as well as reducing the disruption of application of the slurry, thereby forming a substantially homogenous erosion control medium 18 on the ground surface.

A slurry may be spray applied to the desired ground surface in order to dry into an erosion control medium 18. Typical hydroseeding apparatus known in the art is suitable for use with slurries described herein. When sprayed on the ground surface, the slurry is preferably applied so that it forms a layer that is at least about 0.125 inches (or 3 mm) thick, although any layer that is between about 0.1 inches and about 0.2 inches in thickness will provide reasonable erosion control mediums 18 while allowing revegetation. More preferably, the slurry forms a layer that is at least about 0.12 inches thick. Preferably, to minimize shadowing caused by uneven soil surfaces, at least two applications of the slurry are spray-applied to the ground surface where each application is carried out in a different direction. A preferred nozzle for finishing the application of slurries described herein to form erosion control mediums 18 described herein is a fan nozzle.

Referring to FIG. 5, an erosion control medium 18 is formed on a ground surface from the blended mulch product 10 once the blended mulch product 10 is mixed with water to form a slurry which is then spray-applied to the ground surface and allowed to dry. The ground surface may be any surface which one may want to protect from erosion or any surface on which one may want to help establish vegetation. The surface may be an indoor surface or an outdoor surface.

The erosion control medium 18 forms a protective layer above the ground surface. Once the spray-applied slurry dries on the ground surface, the fibers that formed part of the slurry adhere together, forming the erosion control medium 18 that provides a protective layer that is water absorbent, porous, breathable, secures soil and promotes the establishment of vegetation. The erosion control medium 18 that forms has an open weave three-dimensional morphology that will often adhere intimately with the ground surface and bind soil particles to the fibers making up the erosion control medium 18. The open weave morphology of the erosion control medium 18 promotes germination and rooting of seedlings, and in so doing preferably promotes a moist environment and enhanced soil temperatures. The erosion control medium 18 also protects the ground surface from the impact of rain and the effect of wind velocity. The erosion control medium 18 is typically water insoluble when rewetted due to precipitation.

In another aspect, the erosion control medium 18 offers enhanced performance properties when subjected to rain and water (i.e. rewetted). Using the blended mulch product 10 described herein, the erosion control medium 18 preferably retains integrity and form when subjected to rain and water. More preferably, the erosion control medium 18 will have improved wet strength properties that help prevent water from destroying the integrity of the erosion control medium 18 thus preventing soil erosion of underlying soils. The substantially straight synthetic fibers 14 used in the blended mulch product 10, which is then used to form the erosion control medium 18, provide the desired wet strength properties to the erosion control medium 18. The substantially straight synthetic fibers 14 preferably add loft and increased wet tensile strength to the erosion control medium 18. The other components of the blended mulch product 10 also contribute to the desired properties, including wet strength, and preferably it is the interaction between all of the components that provide the overall characteristics of the erosion control medium 18. In the first embodiment, once dried, the components of the blended mulch product 10 in the erosion control medium 18 adhere together, forming an open weave matrix which is a protective layer that is water absorbent, porous, breathable, helps secure soil and enhances the establishment of vegetation.

Preferably, the erosion control medium 18 forms a substantially homogenous protective layer that is water insoluble when rewetted by precipitation or other sources. In the first embodiment, the erosion control medium 18 can be rewetted over many months and will continue to retain its form.

The presence of the substantially straight synthetic fibers 14 preferably does not result in an increase in dry tensile strength of the erosion control medium 18 as compared to an erosion control medium without the substantially straight synthetic fibers 14. As well, the presence of the substantially straight synthetic fibers 14 in the erosion control medium 18 preferably increases the modulus of elasticity of the erosion control medium 18 as compared to an erosion control medium without the substantially straight synthetic fibers 14.

In another variation, the presence of the substantially straight synthetic fibers 14 in the erosion control medium 18 increases the wet tensile strength of the erosion control medium 18 as compared to an erosion control medium without the substantially straight synthetic fibers 14. In yet another variation, the presence of the substantially straight synthetic fibers 14 in the erosion control medium 18 increases a tensile strength that is retained in the erosion control medium 18 when rewetted, as compared to an erosion control medium without the substantially straight synthetic fibers 14.

Preferably, the erosion control medium 18 formed from the blended mulch product 10 has a dry tensile strength of about 17 SAS (N/g) to about 36 SAS (N/g). More preferably, the erosion control medium 18 formed from the blended mulch product 10 has a dry tensile strength of about 22 SAS (N/g) to about 26 SAS (N/g).

The erosion control medium 18 formed from the blended mulch product 10 preferably also has a wet tensile strength of about 4 SAS (N/g) to about 7 SAS (N/g).

Aspects of the use and application of the blended mulch product 10 comprising ligno-cellulosic fibers 12, substantially straight synthetic fibers 14 and tackifier 16 are further explained by reference to the following examples.

EXAMPLE 1

Effect of Substantially Straight Synthetic Fibers on Dry Tensile Strength

The effect of the addition of substantially straight polypropylene monofilament fibers, each having a length of about 0.5 inches, to an erosion control medium on the dry tensile strength of the erosion control medium was evaluated. Slurries made up of 50 pounds of dry blends of fibers and tackifier were mixed together with 100 US gallons of water. Samples of the slurries were applied to 8 inch×8 inch Teflon™ lined pans at a rate of 3500 pounds/acre and then placed in an oven set at 64° C. until dry, to create erosion control mediums. Two types of erosion control mediums were prepared, one consisting of 90% wood fiber and 10% tackifier and another consisting of 87% wood fiber, 3% substantially straight polypropylene monofilament fibers and 10% tackifier. Individual specimens of 38 mm×88 mm were cut from each erosion control medium. Specimens were tested for dry tensile strength using a 4204 Instron™ testing machine with the crosshead speed set to 1 mm/min. Specific adhesive strength (SAS) was calculated by using maximum load divided by the weight of the individual erosion control medium. The averaged results, shown in Table 5, indicate that erosion control mediums without the substantially straight synthetic fibers have a higher SAS value than erosion control mediums that contain substantially straight synthetic fibers, indicating that an addition of substantially straight synthetic fiber that will not entangle with the wood fiber decreases the dry tensile strength of the erosion control medium.

TABLE 5

| Specimen | Dry Tensile SAS (N/g) |
|---|---|
| Erosion control medium without substantially straight synthetic fibers | 25.4 |
| Erosion control medium with 3% substantially straight synthetic fibers | 23.3 |

EXAMPLE 2

Effect of Substantially Straight Synthetic Fibers on Wet Tensile Strength

Erosion control medium specimens were prepared as described in Example 1. Prior to testing, specimens were soaked for 30 minutes in room temperature water, and then excess water was blotted off using pulp blotters. Tensile strength testing was conducted as described in Example 1.

The averaged results of Example 2 are shown in Table 6. Wet tensile strength results of the erosion control mediums containing substantially straight polypropylene monofilament fibers were superior to the erosion control mediums without the substantially straight synthetic fibers. This indicates that the substantially straight synthetic fiber adds wet strength to the erosion control medium. Furthermore, the percentage of retained tensile strength after wetting is higher for the erosion control mediums containing substantially straight synthetic fibers than it is for erosion control mediums without substantially straight synthetic fibers.

TABLE 6

| Specimen | Wet Tensile SAS (N/g) | Percent Retained Tensile Strength |
|---|---|---|
| Erosion control medium without substantially straight synthetic fibers | 4.8 | 18.7 |
| Erosion control medium with 3% substantially straight synthetic fibers | 5.4 | 23.2 |

EXAMPLE 3

Effect of Substantially Straight Synthetic Fibers on Modulus of Elasticity

Erosion control medium specimens were prepared as described in Example 1, except that the specimens were cut to 38 mm×100 mm. Erosion control medium specimens were tested flexurally using an Instron™ 4204 testing machines et at 5 mm/min and a bending jig with a span of 76.2 mm.

The averaged results are shown in Table 7. Modulus of elasticity results indicate that erosion control mediums containing substantially straight synthetic fibers have a higher stiffness than erosion control mediums without substantially straight synthetic fibers.

TABLE 7

| Specimen | Modulus of Elasticity (psi) |
| --- | --- |
| Erosion control medium without substantially straight synthetic fibers | 10670 |
| erosion control medium with 3% substantially straight synthetic fibers | 14210 |

ADDITIONAL ASPECTS AND CHARACTERISTICS

A variety of additional aspects and characteristics of the present invention are described below, in addition to the various aspects and characteristics discussed above in this specification. Furthermore, as with the aspects and characteristics described above, each of the following aspects and characteristics individually and in various combinations provides a beneficial enhancement and is an embodiment of the present invention. These additional aspects and features will now be described below.

In one aspect, a blended mulch product 10 is provided which can be mixed with water and spray-applied to a ground surface to form an erosion control medium 18. In this case, the blended mulch product comprises: (a) about 75% to about 92% by weight ligno-cellulosic fibers 12; (b) about 1% to about 10% by weight stiff natural fibers; and (c) a tackifier 16. The ligno-cellulosic fibers 12 and the tackifier 16 are preferably selected from those described in the earlier aspects of the present invention. With this aspect, the stiff natural fibers are stiffer than the ligno-cellulosic fibers 12. Preferably, the stiff natural fibers also have coarser fiber properties than the ligno-cellulosic fibers 12. More preferably, the stiff natural fibers are selected from at least one of the group consisting of: flax, jute, hemp, sisal, cotton, coir, and kenaf. In one variation, the stiff natural fibers are selected from at least one of the group consisting of acetate and rayon. Preferably, the stiff natural fibers are more hydrophobic than the ligno-cellulosic fibers 12. In another aspect, the stiff natural fibers are biodegradable.

In another aspect, a blended mulch product 10 is provided which can be mixed with water and spray-applied to a ground surface to form an erosion control medium 18. In this case, the blended mulch product 10 comprises: (a) about 75% to about 92% weight ligno-cellulosic fibers 12; (b) about 1% to about 10% by weight stiff fibers consisting of stiff natural fibers and substantially straight synthetic fibers 14; and (c) tackifier 16. The ligno-cellulosic fibers 12, the substantially straight synthetic fibers 14, the stiff natural fibers and the tackifier 16 are preferably selected from those described in the earlier aspects of the present invention. Here again, the substantially straight synthetic fibers 14 are resistant to crimping and maintain their substantially straight form in the blended mulch product 10 and preferably in the erosion control medium 18.

In yet another aspect of the present invention, an erosion control medium 18 is provided for reducing erosion of a ground surface, formed from spray-application on the ground surface of a slurry comprising a blended mulch product 10 and water. In this aspect, the erosion control medium 18 comprises: (a) about 75% to about 92% weight ligno-cellulosic fibers 12; (b) about 1% to about 10% by weight substantially straight synthetic fibers 14; and (c) a tackifier 16. The substantially straight synthetic fibers 14 are resistant to crimping and wherein the erosion control medium 18 forms a substantially homogenous open weave matrix on the ground surface. The ligno-cellulosic fibers 12, the substantially straight synthetic fibers 14 and the tackifier 16 are preferably selected from those described in the earlier aspects of the present invention. Preferably, the substantially straight synthetic fibers 14, the ligno-cellulosic fibers 12 and the tackifier 16 form a substantially homogenous erosion control medium 18.

In another aspect, an erosion control medium 18 is provided for reducing erosion of a ground surface, formed from spray-application on the ground surface of a slurry comprising a blended mulch product 10 and water. In this aspect, the erosion control medium 18 comprises: (a) about 80% to about 90% by weight ligno-cellulosic fibers 12; (b) about 1% to about 7% by weight substantially straight synthetic fibers 14; and (c) a tackifier 16. The substantially straight synthetic fibers 14 are resistant crimping and the erosion control medium 18 forms a substantially homogenous open weave matrix on the ground surface. The ligno-cellulosic fibers 12, the substantially straight synthetic fibers 14 and the tackifier 16 are preferably selected from those described in the earlier aspects of the present invention.

Although this invention has been described with reference to illustrative and preferred embodiments of carrying out the invention, this description is not to be construed in a limiting sense. Various modifications of form, arrangement of parts, steps, details and order of operations of the embodiments illustrated, as well as other embodiments of the invention, will be apparent to persons skilled in the art upon reference to this description. It is therefore contemplated that the appended claims will cover such modifications and embodiments as fall within the true scope of the invention.

What is claimed is:

1. A process for preparing a blended mulch product which can be mixed with water and spray-applied to a ground surface to form an erosion control medium, the process comprising:
   a) providing fluffed ligno-cellulosic fibers;
   b) mixing substantially straight synthetic fibers with the fluffed ligno-cellulosic fibers; and
   c) mixing a tackifier with the fluffed lingo-cellulosic fibers to form the blended mulch product;
   wherein the blended mulch product includes about 75% to about 92% by weight of the ligno-cellulosic fibers, about 1% to about 10% by weight the substantially straight synthetic fibers, and the tackifier; and
   wherein the substantially straight synthetic fibers maintain their substantially straight form in the blended mulch product and the erosion control medium.

2. The process of claim 1, wherein the ligno-cellulosic fibers are fluffed via mechanical fluffing.

3. The process of claim 1, wherein mixing the substantially straight synthetic fibers with the fluffed ligno-cellulosic fibers is mechanical mixing.

4. The process of claim 1, wherein mixing the tackifier with the mixed fibers is mechanical mixing.

5. The process of claim 1 further comprising: (d) packaging the blended mulch product.

6. The process of claim 1 further comprising: (d) mixing seeds, fertilizers, lime, or combinations thereof with the fluffed lingo-cellulosic fibers.

7. The process of claim 1 further comprising: (d) forming the blended mulch product into a slurry by addition of water.

8. The process of claim 7, wherein the slurry is formed with agitation.

9. The process of claim 1, wherein the substantially straight synthetic fibers each have a straight ratio ($D_{not}:D_{max}$) of at least about 3:5 to about 1:1, $D_{max}$ representing a maximum potential distance of a particular synthetic fiber having a first end point and a second end point, with the first and second end points located at opposing ends of an elongated portion of the particular synthetic fiber, the maximum potential distance being measured along the elongated portion of the particular synthetic fiber when the particular synthetic fiber is completely straight, $D_{not}$ representing a notional shortest distance between said end points.

10. A process for preparing a blended mulch product which can be mixed with water and spray-applied to a ground surface to form an erosion control medium, the process comprising:
   a) providing fluffed ligno-cellulosic fibers;
   b) mixing substantially straight synthetic fibers with the fluffed ligno-cellulosic fibers; and
   c) mixing a tackifier with the fluffed lingo-cellulosic fibers to form the blended mulch product;
   wherein the blended mulch product includes about 75% to about 92% by weight of the ligno-cellulosic fibers, about 1% to about 10% by weight the substantially straight synthetic fibers, and the tackifier; and
   wherein the substantially straight synthetic fibers maintain their substantially straight form in the blended mulch product and the erosion control medium; and wherein the substantially straight synthetic fibers each have a straight ratio ($D_{not}:D_{max}$) of at least about 3:5 to about 1:1, $D_{max}$ representing a maximum potential distance of a particular synthetic fiber having a first end point and a second end point, with the first and second end points located at opposing ends of an elongated portion of the particular synthetic fiber, the maximum potential distance being measured along the elongated portion of the particular synthetic fiber when the particular synthetic fiber is completely straight, $D_{not}$ representing a notional shortest distance between said end points.

11. The process of claim 10, wherein the ligno-cellulosic fibers are fluffed via mechanical fluffing.

12. The process of claim 10, wherein mixing the substantially straight synthetic fibers with the fluffed ligno-cellulosic fibers is mechanical mixing.

13. The process of claim 10, wherein mixing the tackifier with the mixed fibers is mechanical mixing.

14. The process of claim 10 further comprising: (d) packaging the blended mulch product.

15. The process of claim 10 further comprising: (d) mixing seeds, fertilizers, lime, or combinations thereof with the fluffed lingo-cellulosic fibers.

16. The process of claim 10 further comprising: (d) forming the blended mulch product into a slurry by addition of water.

17. A process for preparing a blended mulch product which can be mixed with water and spray-applied to a ground surface to form an erosion control medium, the process comprising:
   a) providing fluffed ligno-cellulosic fibers;
   b) mixing substantially straight synthetic fibers with the fluffed ligno-cellulosic fibers;
   c) mixing a tackifier with the fluffed lingo-cellulosic fibers; and
   d) mixing seeds, fertilizers, lime, or combinations thereof with the fluffed lingo-cellulosic fibers to form the blended mulch product;
   wherein the blended mulch product includes about 75% to about 92% by weight of the ligno-cellulosic fibers, about 1% to about 10% by weight the substantially straight synthetic fibers, and the tackifier; and
   wherein the substantially straight synthetic fibers maintain their substantially straight form in the blended mulch product and the erosion control medium, and wherein the substantially straight synthetic fibers each have a straight ratio ($D_{not}:D_{max}$) of at least about 3:5 to about 1:1, $D_{max}$ representing a maximum potential distance of a particular synthetic fiber having a first end point and a second end point, with the first and second end points located at opposing ends of an elongated portion of the particular synthetic fiber, the maximum potential distance being measured along the elongated portion of the particular synthetic fiber when the particular synthetic fiber is completely straight, $D_{not}$ representing a notional shortest distance between said end points.

18. The process of claim 17, wherein the ligno-cellulosic fibers are fluffed via mechanical fluffing.

19. The process of claim 17 further comprising: (e) packaging the blended mulch product.

20. The process of claim 17 further comprising: (e) forming the blended mulch product into a slurry by addition of water.

* * * * *